(12) United States Patent
Bailey et al.

(10) Patent No.: US 8,006,187 B1
(45) Date of Patent: Aug. 23, 2011

(54) CHECKPOINT SEQUENCE FALLOUT METRICS MANAGEMENT DURING PATH ANALYSIS

(75) Inventors: Michael Paul Bailey, Provo, UT (US); Christopher Reid Error, Pleasant Grove, UT (US)

(73) Assignee: Adobe Systems Incorporated, San Jose, CA (US)

(*) Notice: Subject to any disclaimer, the term of this patent is extended or adjusted under 35 U.S.C. 154(b) by 976 days.

(21) Appl. No.: 11/736,867

(22) Filed: Apr. 18, 2007

Related U.S. Application Data

(60) Provisional application No. 60/889,273, filed on Feb. 10, 2007.

(51) Int. Cl.
*G06F 3/00* (2006.01)
(52) U.S. Cl. ........ 715/734; 715/853; 715/733; 715/735; 715/736; 715/737; 715/738
(58) Field of Classification Search .................. 715/853, 715/733, 734, 735, 736, 737, 738
See application file for complete search history.

(56) References Cited

U.S. PATENT DOCUMENTS

| | | | |
|---|---|---|---|
| 6,732,167 | B1 | 5/2004 | Swartz et al. |
| 6,850,988 | B1* | 2/2005 | Reed ............... 709/238 |
| 7,318,056 | B2* | 1/2008 | Taniguchi et al. ........ 1/1 |
| 7,644,134 | B2* | 1/2010 | Cohen et al. .......... 709/218 |
| 2002/0198750 | A1 | 12/2002 | Innes et al. |
| 2003/0115333 | A1 | 6/2003 | Cohen et al. |
| 2003/0128231 | A1* | 7/2003 | Kasriel et al. .......... 345/736 |
| 2004/0059746 | A1 | 3/2004 | Error et al. |
| 2006/0085788 | A1* | 4/2006 | Amir et al. ............ 718/100 |
| 2006/0123340 | A1 | 6/2006 | Bailey et al. |
| 2006/0149728 | A1 | 7/2006 | Error et al. |
| 2006/0274763 | A1 | 12/2006 | Error |
| 2006/0277087 | A1 | 12/2006 | Error |
| 2006/0277197 | A1 | 12/2006 | Bailey |
| 2006/0277212 | A1 | 12/2006 | Error |
| 2006/0277585 | A1 | 12/2006 | Error et al. |

OTHER PUBLICATIONS

Allen S. Crane, "Actionable E-Metrics", www.intelligententerprise.com, Feb. 1, 2003.
Pages from www.inetasia.com, no later than Dec. 15, 2006.
Avinash Kaushik, "Path Analysis: A Good Use of Time?", www.kaushik.net, May 25, 2006.
"Omniture B2B Online Marketing Guide: 5 Critical Principles", www.cornucopiagroup.com/documents/omniture.pdf, Sep. 2006.
"PowerSeller(R) Risk Manager", www.asconline.com/pdfs/ps_risk_mgr.pdf, copyright 2005.
"Path analysis (computing)", en.wikipedia.org, Oct. 7, 2006.
"Omniture: On-Demand Web Analytics", www.windley.com, Dec. 21, 2004.

* cited by examiner

*Primary Examiner* — Weilun Lo
*Assistant Examiner* — Mylinh Tran
(74) *Attorney, Agent, or Firm* — Robert C. Kowert; Meyertons, Hood, Kivlin, Kowert & Goetzel, P.C.

(57) ABSTRACT

Tools and techniques are provided for interactive fallout analysis. Checkpoints, such as web pages visited, are defined through user input. As the second and subsequent checkpoints are added, fallout metrics are automatically calculated and displayed for the checkpoint pairs. The user receives fallout information interactively, in response to each change in the sequence of checkpoints, rather than being forced to define all checkpoints and then wait while the fallout metrics are calculated for a batch of checkpoint definition changes. Special coloring or other visualization highlights indicate when the fallout between two checkpoints is total.

20 Claims, 3 Drawing Sheets

CHECKPOINT SEQUENCE FALLOUT METRICS MANAGEMENT DURING PATH ANALYSIS

RELATED APPLICATION

The present application claims priority to, and incorporates by reference, U.S. provisional patent application Ser. No. 60/889,273, filed Feb. 10, 2007.

BACKGROUND

Web site usage via browsers is regularly tracked and analyzed by commercially available web analytics services, which gather detailed data about web page usage, and to some extent about particular web site users. Entities which provide other entities with web analytics services are referred to as "analytics providers". One leading web analytics provider is Omniture, Inc., of Orem, Utah, the owner of the present invention. Omniture provides web analytics technology under its well-known mark SiteCatalyst™. All other marks used herein are property of their respective owners.

At present web analytics data are typically collected from server logs or using web-beacons. Web-beacons are small image requests placed in a web page to cause communication between the user's device and a server. The server may be controlled by the analytics provider, by the vendor whose website contains the web-beacons, or by another party. Web-beacons are also known as clear GIFs, web bugs, image requests, or pixel tags. Web-beacons can be used for advertising, behavioral targeting, and other processes, to gather information a visits to websites. Web-beacons are commonly used by analytics providers to gather analytics data.

Web analytics data is more useful when it is presented in a manner that answers pertinent business questions. Toward that end, Omniture has provided various tools and services which filter, visualize, organize, and otherwise help manage raw analytics data in order to help Omniture clients and partners improve their web sites and services.

In particular, Omniture has commercially provided a report builder program and a compatible but separate checkpoint editor program. The user operated these programs generally as follows. The user launched the builder, and in a separate window launched the checkpoint editor. In the checkpoint editor, the user defined a plurality of checkpoints which correspond to web pages a visitor might visit in a web site. When the user had made all desired additions, deletions, or other changes to the checkpoint definitions, the user pressed a button indicating that a batch of checkpoints was ready for processing. In response, the report builder ran. The report builder imported the checkpoint definitions, accessed analytics data gathered about visits to the web site, created a report based on the checkpoints and the analytics data, and then displayed the report. One type of report, known as a "fallout report", shows for each checkpoint how many visitors left the path defined by the checkpoints. Fallout reporting is an example of "path analysis", the study of paths taken by web site visitors.

The user could change the checkpoints, e.g., by adding another checkpoint to the defined sequence, or by removing one of the checkpoints. In order to obtain an updated report after editing the checkpoints, the user ran the report builder again. The report builder built a new report, based on the new checkpoints and the web analytics data. This new report was built from scratch. That is, given the same checkpoints and the same analytics data (and the same report builder software), the report will be built in the same way each time regardless of any overlap between the new checkpoints for which the report is being built and any previous sequence of checkpoints. In other words, the report builder has no "memory" of its previous work, so it duplicates some report building work when some of the checkpoint pairs are unchanged.

Other concepts related to the present invention may be known, or become apparent through sources other than this background, including without limitation the references being made of record in connection with the present patent application.

SUMMARY

The present invention provides tools and techniques for displaying information in a user interface during path analysis, including for example path analysis performed by an online vendor using web analytics data. Methods of the invention may also be used by other entities, and/or for different purposes. One method interactively configures a display as follows. In response to user input, implementing software causes modification of a sequence of displayed checkpoints, each checkpoint representing at least one point from a sequence of tracked points; this modifying step including at least one of: adding a checkpoint to the sequence of displayed checkpoints, (e.g., using a drag-and-drop operation), replacing a checkpoint in the sequence of displayed checkpoints, deleting a checkpoint from the sequence of displayed checkpoints, changing the position of a checkpoint relative to another checkpoint in the sequence of displayed checkpoints. A given checkpoint may be defined by the user (or predefined) by specifying a web page in a web analytics system for tracking web page visits, for example, or by specifying a plurality of web pages in a web analytics system for tracking web page visits, such that a visit to any of the specified web pages serves as a visit to that checkpoint for the purpose of determining fallout.

After the checkpoint sequence modifying step, and without requiring further user input, the implementation automatically displays (with the modified sequence of displayed checkpoints) a current corresponding sequence of fallout metrics which reflect fallout between displayed checkpoints. "Automatically" as used herein generally means without requiring further user input or action. In some embodiments, for example, no user command is accepted by the user interface between completion of checkpoint modifying and completion of automatically displaying a current corresponding sequence of fallout metrics. In some, no user keyboard input is received through the user interface between beginning the checkpoint modifying step and completing the step of automatically displaying a current corresponding sequence of fallout metrics.

In some embodiments, the modified sequence of displayed checkpoints and the current corresponding sequence of fallout metrics are displayed simultaneously in a single window or pane. In some, the current fallout metric corresponding to two consecutive displayed checkpoints is displayed near those checkpoints, where "near" means one or more of between those checkpoints, on one of those checkpoints, within one fifth of the display's width of at least those checkpoints, within one fifth of the display's height of at least those checkpoints. A conversion (non-fallout) value for checkpoints may also be displayed.

In some datasets, some embodiments automatically display a red bar, a flashing icon, a buzzer or beep sound, or another indication in the display that fallout from one checkpoint to another checkpoint is total. "Display" means userperceptible output, including without limitation screen (visual) output and/or speaker (audio) output.

In addition to methods, the invention also provides systems, memories configured with data, process products (checkpoints plus fallout metrics display), and the like. For example, some embodiments include a computer readable storage medium, configured with instructions for performing a method of displaying information in a user interface during path analysis. As another example, some embodiments include a web analytics system which has a processor; a memory which is interoperable with the processor; a display (screen and/or speakers); a sequence of displayed checkpoints configuring the display, each checkpoint representing at least one web page; and checkpoint sequence fallout metrics management code configuring the memory, the code capable of execution by the processor to modify the display by adding a checkpoint to the sequence of displayed checkpoints in response to user action and then automatically displaying without further user input a current corresponding sequence of fallout metrics which reflect fallout between displayed checkpoints. In some systems, the sequence of displayed checkpoints and the current corresponding sequence of fallout metrics are displayed without entirely regenerating the fallout metrics from raw analytics data. In some, the checkpoint sequence fallout metrics management code reuses a previously calculated fallout metric rather than recalculating that fallout metric.

These examples are merely illustrative. The present invention is defined by the claims, and even though this summary helps provide a basis for claims, to the extent this summary conflicts with the claims ultimately granted, those claims should prevail.

DRAWINGS

To illustrate ways in which advantages and features of the invention can be obtained, a description of the present invention is given with reference to the attached drawings. These drawings only illustrate selected aspects of the invention and thus do not fully determine the invention's scope.

DETAILED DESCRIPTION

Introduction

Figure 1:
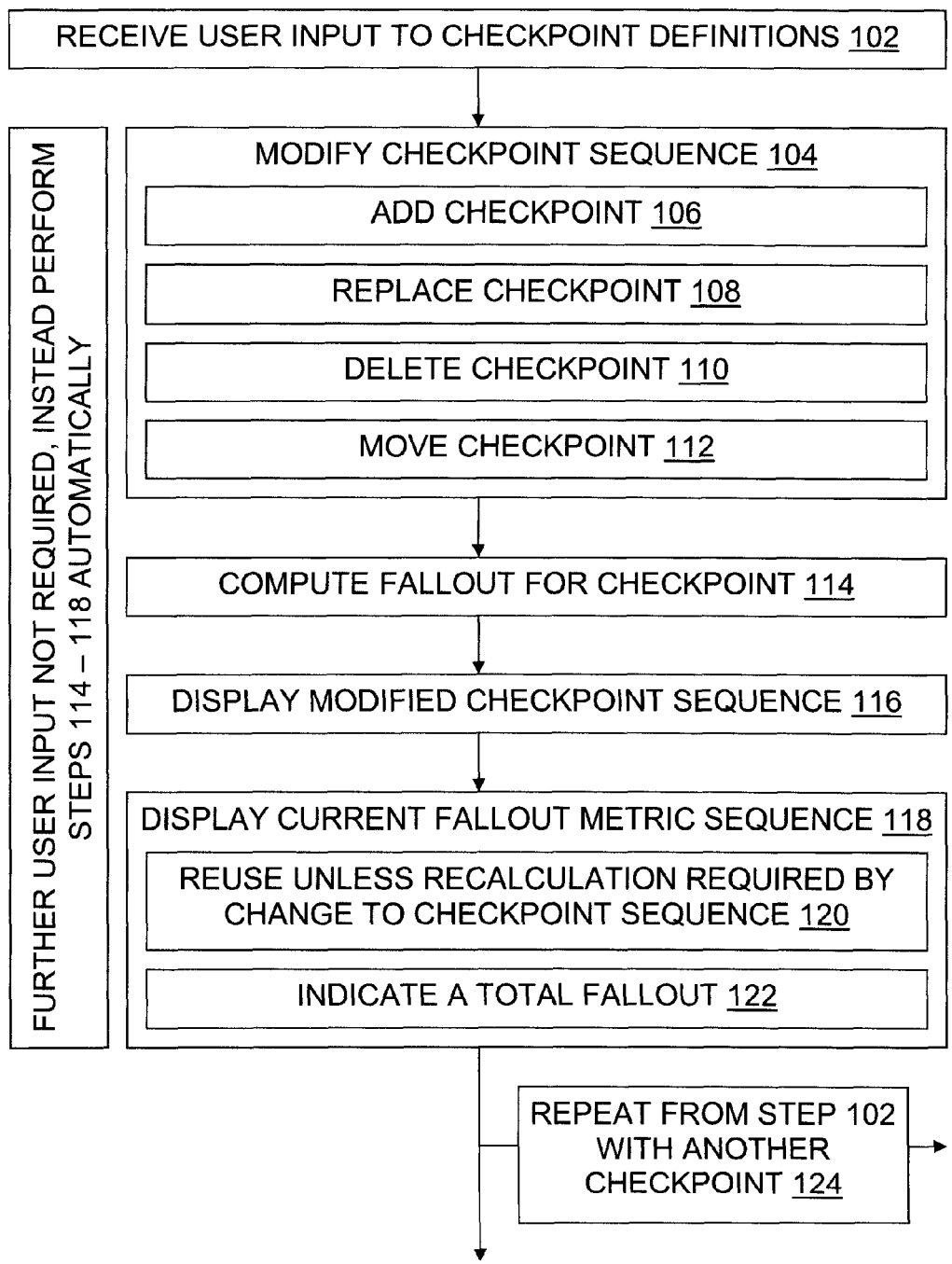
FIG. 1 is a flow chart illustrating methods of checkpoint sequence fallout metrics management according to at least one embodiment of the present invention.

The present invention provides tools and techniques to help manage path analysis, and in particular to help analyze fallout and conversion along a user-defined path through a large dataset, such as (but not necessarily limited to) a web analytics database which tracks visitor movements through a web site. The invention is illustrated in discussions herein and in the drawing figures by specific examples, but it will be appreciated that other embodiments of the invention may depart from these examples. For instance, specific features of an example may be omitted, renamed, grouped differently, repeated, instantiated in hardware and/or software differently, performed in a different order, or be a mix of features appearing in two or more of the examples. Likewise, although the invention arose in a web analytics context, the inventive methods, media, and systems can also be used for fallout analysis of other types of data, e.g., project management data, risk mitigation data.

Definitions of terms are provided explicitly and implicitly throughout this document. Terms do not necessarily have the same meaning here that they have in general usage, in the usage of a particular industry, or in a particular dictionary or set of dictionaries. The inventors assert and exercise their right to be their own lexicographers, with respect to both coined terms and other terms.

For instance, "analytics" is used somewhat broadly herein. Analytics technology generates and/or gathers data about visitor behavior in websites, including in some cases web page visits, Flash or other multimedia presentation interactions, RSS or other feed interactions, and/or other visitor behavior during networked presentations, in a manner similar to widely used HTML web page analytics.

It is not necessary for every inventive embodiment or configuration to include every component shown in the figures or discussed in the text, or to include components in the same numbers and relationships shown here. The figures and textual descriptions are merely examples.

Methods and More

FIG. 1 illustrates methods for managing checkpoints and fallout metrics. Although these inventive methods may be performed by an analytics provider customer, they may also be performed by another entity, including without limitation by an entity which acts under the direction of, and/or for the benefit of, an analytics provider. Indeed, they may be performed by a partner of the analytics provider, for the mutual benefit of the partner and the analytics provider. When they operate on datasets other than web analytics databases, the methods may well be performed by other types of entities. Regardless, reference is made to several figures below, because an understanding of the inventive systems and devices will help an understanding of the methods, and vice versa.

Figure 2:
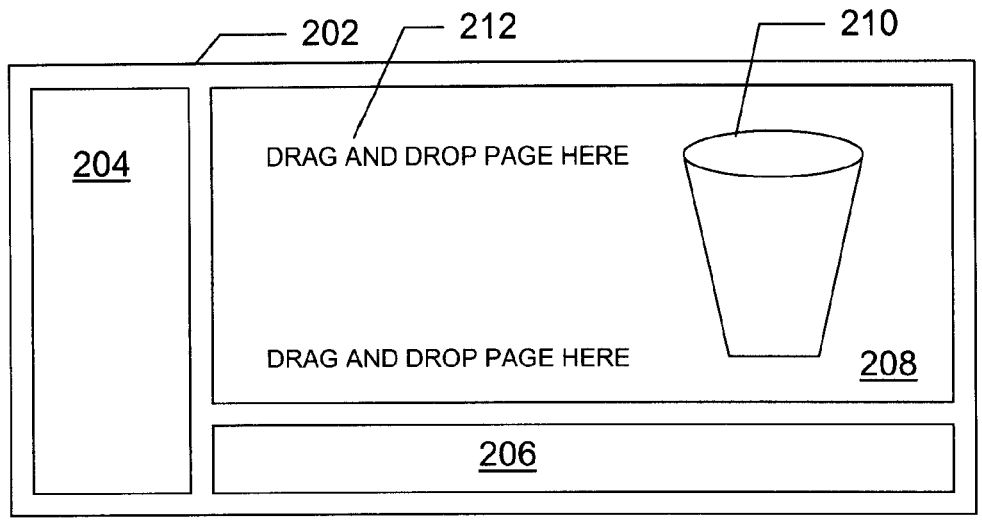
FIG. 2 is a simplified screen display further illustrating the methods of FIG. 1, showing a user interface just prior to the addition of a first checkpoint to a checkpoint sequence.
Figure 3:
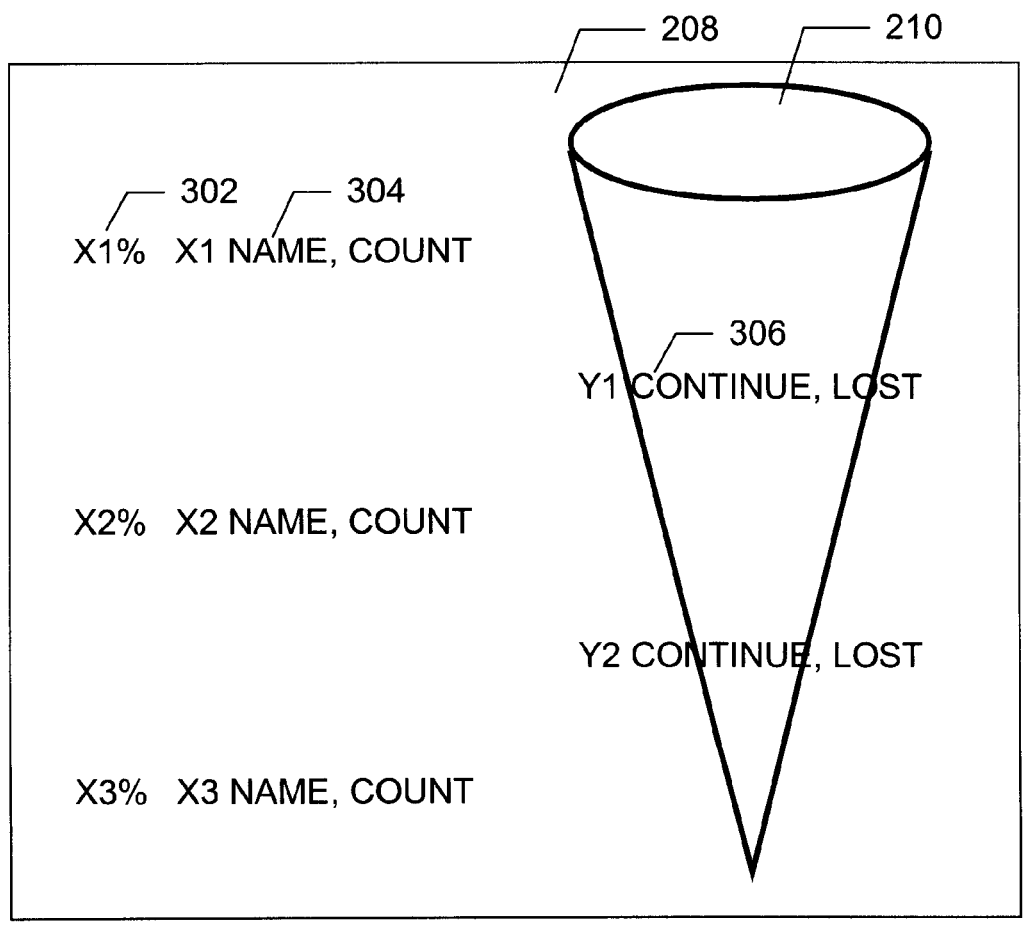
FIG. 3 is a simplified screen display further illustrating the methods of FIG. 1, showing a user interface in a web analytics system after the addition of three checkpoints to a checkpoint sequence, with corresponding fallout metrics also displayed.

During an input receiving step 102, a user 402 provides input to a system 404 through a keyboard 408, mouse 410, network link 410, and/or other peripherals. The input provides data for use in modifying a sequence of checkpoints 422. Typically, the input will specify one or more web pages 436 whose database 432 representation is to be used as a checkpoint, and the input will specify a position (first checkpoint, second checkpoint, etc.) for that checkpoint in a sequence of checkpoints 422. In an interface like those represented in FIGS. 2 and 3, for example, the checkpoint definitions may be input 102 when a user 402 drags a web page 436 icon onto a specified screen 202 location 212 and drops it there by releasing a mouse 410 button. FIG. 2 shows an interface 208 before any checkpoint definitions 422 have been received 102, while FIG. 3 shows an interface after three checkpoint definitions 422 (represented by their page names 304) have been received 102.

Note that many steps of methods of the present invention can be viewed either from the perspective of a user 402 (end user, administrator, etc.) or from the perspective of the implementation (software, hardware, etc.). Such a step can be denoted in each case by the same reference numeral (102, in this instance) regardless of the perspective. Infringement occurs, if only by equivalents, when all required actions are taken, regardless of whether one views those actions as being taken by a machine, by a person operating the machine, or some combination of the two.

The embodiment uses the received 102 input to modify 104 the current sequence of checkpoints 422. Modification updates (creates) data structures 420 in RAM 414, and the code updates 116 the interface display 208 accordingly, e.g., by showing 116 the checkpoint's name 304 on a screen at a location chosen by the user. The number of items (e.g., user visits to the page(s) 436 of the checkpoint) may also be displayed; this is indicated in FIG. 3 by the term "COUNT" on the screen—in an implementation using specific data, specific numbers would be displayed. The modification 104 may do one or more of the following: add 106 a new checkpoint to the sequence, replace 108 one checkpoint in the sequence with a different checkpoint (that is, overwrite it or otherwise modify its page(s) 436 definition), delete 110 a checkpoint from the sequence resulting in the sequence containing fewer checkpoints, move 112 a checkpoint to a different position within the sequence, e.g., leave its definition in terms of pages 436 unchanged but move it to a position before/after another checkpoint that it was just previously after/before.

The illustrated embodiment also computes 114 fallout for the modified sequence of checkpoints. Fallout is the number/percentage of tracked items (e.g., web page visitor paths in the analytics database 432) that do not reach the next checkpoint. Thus, fallout occurs along a path which is defined by the checkpoints. Conversion is the complement of fallout, namely, the number/percentage of tracked items that do reach the next checkpoint. The fallout number/percentage and the conversion number/percentage are some "fallout metrics". In FIG. 3, conversion is indicated by the term "CONTINUE" and fallout is indicated by "LOST"—in an implementation using specific data, specific numbers/percentages would be displayed. Some embodiments compute 114 and display 118 both fallout and conversion, while others provide only fallout, or provide only conversion, among their fallout metrics.

In some embodiments, the special case in which conversion is zero (or near enough zero, as defined by some threshold value that is either built in or user-defined) is highlighted 122 in the display. For instance, the displayed 122 metric 306 might be visually larger, bold, colored differently, flashing, and/or accompanied by a distinctive sound when conversion is zero (and hence, when fallout is total). One advantage of this, when taken in combination with the short cycle (interactive rather than batch) 124 feature noted below, is that users will no longer face a situation in which they carefully define multiple checkpoints and submit them as a batch, only to learn that total fallout occurred somewhere partway through the sequence of checkpoints they defined, thereby wasting their time and effort in defining the rest of the sequence—it is merely an empty tail end in which fallout remains total.

In operation, some embodiments of the present invention cycle 124 interactively. That is, the embodiment goes through one instance of step 102 (receiving a change to only one checkpoint), step 104 (modifying the sequence only as needed to implement the requested change to the single checkpoint that was expressly identified in the user input 102), one corresponding step 114 (calculating only the fallout change(s) made necessary by the change to that single checkpoint—other unchanged fallout metrics are reused 120), one corresponding step 116, and one corresponding step 118, before then repeating the cycle by receiving 102 additional input requesting either a change to a different checkpoint or a different change (e.g., in member pages 436) to the checkpoint. This interactive cycle 124 distinguishes such embodiments in operation from some other approaches, namely, those in which multiple checkpoint definition changes are submitted, with no fallout metric update made and/or made visible to users between submission of the respective checkpoint changes, because a batch of multiple checkpoint changes is acted on by computing fallout metrics for the entire modified sequence.

Thus, some embodiments provide a method of displaying information in a user interface during path analysis, including interactively configuring a display 208 by doing the following. In response to user input 102, modify 104 a sequence of displayed checkpoints 422, each checkpoint representing at least one point from a sequence of tracked points, the modifying step including at least one of: adding 106 a checkpoint to the sequence of displayed checkpoints, replacing 108 a checkpoint in the sequence of displayed checkpoints, deleting 110 a checkpoint from the sequence of displayed checkpoints, changing 112 the position of a checkpoint relative to another checkpoint in the sequence of displayed checkpoints. Then, without requiring further user input, automatically display 116, 118 with the modified sequence of displayed checkpoints a current corresponding sequence of fallout metrics 306 which reflect fallout between displayed checkpoints. In some cases, adding 106 a checkpoint uses a drag-and-drop operation to insert the added checkpoint. In some cases, replacing 108 a checkpoint uses a drag-and-drop operation to replace one checkpoint with another checkpoint. In some cases, adding 106 or replacing 108 define a checkpoint by specifying a web page 436 in a web analytics system 430, 434, 404 for tracking web page visits. In some, a checkpoint 422 is defined by specifying a plurality of web pages 436 in a web analytics system for tracking web page visits, such that a visit to any of the specified web pages 436 serves as a visit to that checkpoint for the purpose of determining 114 fallout.

In some embodiments, the modified sequence of displayed checkpoints and the current corresponding sequence of fallout metrics are displayed simultaneously in a single window. In some cases, automatically displaying 118 current corresponding fallout metrics 306 includes indicating 122 in the display that fallout from one checkpoint to another checkpoint is total. In some, at least one of the following conditions holds: a current fallout metric 306 corresponding to two consecutive displayed checkpoints is displayed 118 between those checkpoints; a current fallout metric 306 corresponding to two consecutive displayed checkpoints is displayed 118 on one of those checkpoints; a current fallout metric 306 corresponding to two consecutive displayed checkpoints is displayed 118 within one fifth of the display 208 visible viewing width of at least those checkpoints; a current fallout metric 306 corresponding to two consecutive displayed checkpoints is displayed 118 within one fifth of the display's height of at least those checkpoints. In some cases, before the modifying step 104 the sequence of displayed checkpoints included at least two checkpoints and the display 208 also showed a then-current fallout metric 306 reflecting fallout from one of those checkpoints to another of those checkpoints. In some case, both a fallout value and a conversion (non-fallout) value are displayed 118 for given checkpoints.

In some embodiments, no user command is accepted 102 by the user interface between completion of checkpoint modifying 104 and completion of automatically displaying 118 a current corresponding sequence of fallout metrics. In some, no user keyboard 408 input is received 102 through the user interface between beginning the checkpoint modifying step 104 and completing the step of automatically displaying 118 a current corresponding sequence of fallout metrics. These are examples of the cycle 124 in which interactive rather than batch mode checkpoint sequence fallout metric management is done using the invention.

ANOTHER EXAMPLE

To further illustrate the concepts discussed in connection with the Figures, a web analytics example containing a specific number of checkpoints and specific visitor counts is now given. Embodiments may include features of this example, but need not necessarily include every feature of this example. The example is from an internal Omniture product requirements document, marked confidential, for the Omniture Discover 2.0™ product, entitled Fallout Report Enhanced Visualizations PRD. A mock-up figure therein has the general form of FIGS. 2 and 3 herein, with some differences. Standard window icons and navigation tools such as close icons, titles, tabs, menus, scroll bars, resizing icons, and the like are depicted. Information about paths not on the checkpoint is depicted, e.g., top locations where visitors went after leaving a given checkpoint, and how many (number/percentage) went there. Cosmetic graphics, font characteristics, and coloring (including gradient color) are depicted. A left panel 204 includes a Report Menu (Customize, Bookmarks, Summary, Commerce, Traffic, Paths submenus), Segment Filter (View: Preconfigured, Advanced Filter, Loyal Visitors, Visits from Search Engine, Visits from Partner entries), and Metrics (View: Most Popular, Calculated Metrics, Orders, Page Views, Revenue entries). A bottom panel 206 includes a line graph over approximately a six week period. Panel 208 includes a background funnel graphic 210, a title "Segment: Buyers", a Page Selector entry, a title "Bookend Report", and a checkpoint sequence 422 in which five checkpoints are displayed with information 302, 304, 306. The text of the mock-up figure information is substantially smaller than normal 12 point or 14 point patent drawing text, so the information 302, 304, 306 depicted is recited below, with parenthetical comments and reference numbers.

(fallout metric 302) "100%" (checkpoint 304) "Homepage 236,562 visits"
(fallout metric 306) "9.45% continued 90.55% lost"
(fallout metric 302) "9.40%" (checkpoint 304) "Campaign 123 Landing Pages 22,349 visits"
(fallout metric 306) "44.60% continued 55.40% lost"
(fallout metric 302) "4.20%" (checkpoint 304) "http://www.apple.com/macbook/macbook.html 9,967 visits"
(fallout metric 306) "89.07% continued 10.93% lost"
(fallout metric 302) "3.80%" (checkpoint 304) "http://store.apple/com/1-800-MY-APPLE/Webobject/ . . . 8,878 visits"
(fallout metric 306) "75.55% continued 24.45% lost"
(fallout metric 302) "2.80%" (checkpoint 304) "Checkout 6,707 visits"

Systems, Configured Media, and More

Figure 4:
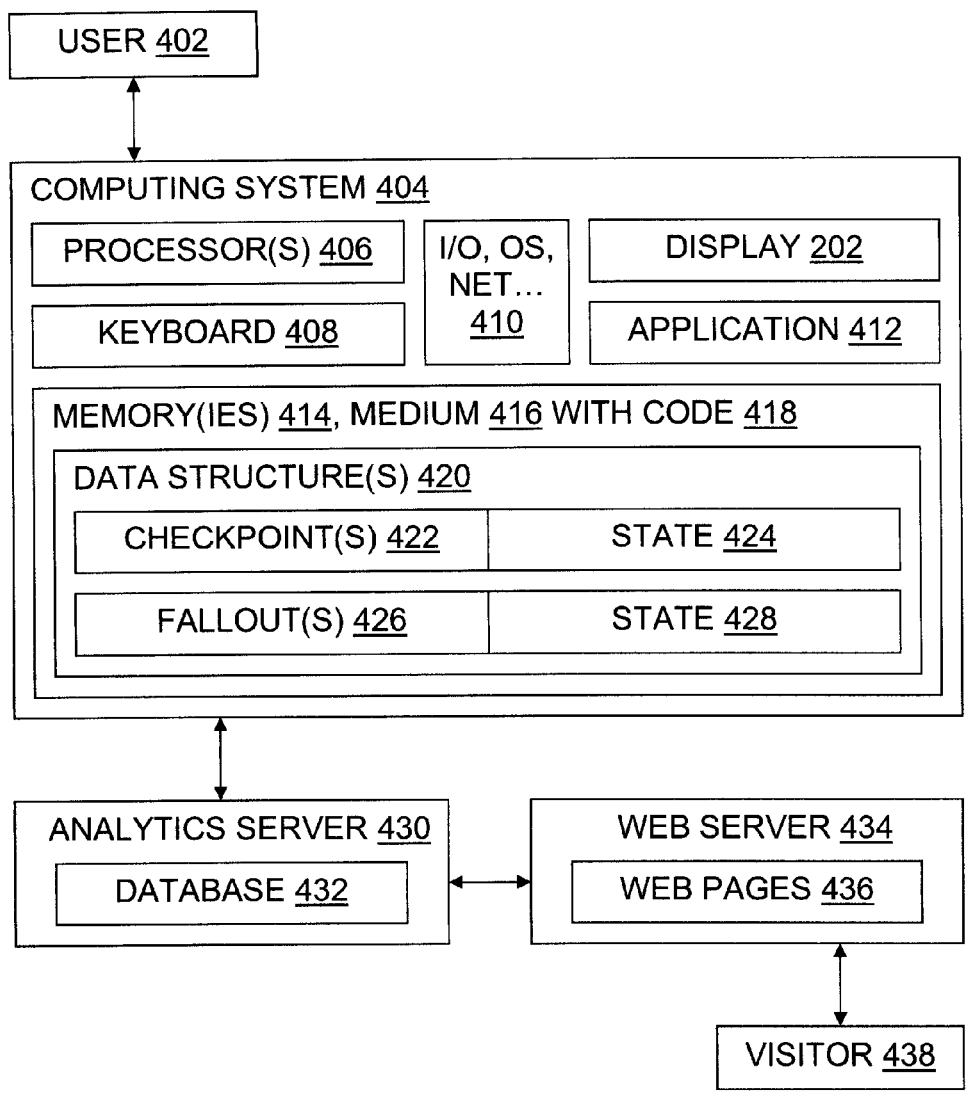
FIG. 4 is a block diagram illustrating roles, data, information and control flow, devices, methods, configured media, and other aspects of some embodiments of the present invention.

FIG. 4 illustrates a web analytics system according to the invention. A visitor 438 visits web pages 436 of a web site that is hosted on a web server 434. An analytics service, such as that provided by Omniture or other analytics providers, tracks visits to the web site, and gathers at least raw data (possibly also processed data) into an analytics database 432. The database is on the analytics server in the illustrated embodiment, but it could also be located elsewhere, e.g., on the same machine as the web site and/or on the same machine as the path analysis application 412 used for checkpoint sequence fallout metrics management. Likewise, the path analysis code 412 could be located on the same machine as the underlying database 432 and/or as the tracked website 436. Part or all of the path analysis code could be code 418 located on a configured medium 416 such as a CD or DVD. The servers shown could be physically separate machines, or merely separate processes running on fewer machines than there are servers shown.

The machine 404 used for fallout analysis by a user 402 will often be a computer with corresponding I/O support 410 (keyboard 408, mouse, screen 202, speakers, trackball, touch screen, stylus, microphone, network link, etc.), path analysis software 412, other software 410 (operating system, file system, diagnostics, other applications), and other hardware (processor 406, local disk 414, etc.). But the user system 404 may include various devices that are capable of receiving web analytics information (or more generally, capable of receiving and presenting any data which is checkpointed and fallout metric managed as discussed herein), such as cell phones, mobile phones, wireless devices such as those sold under the Blackberry mark, personal digital assistants such as those sold under the Palm mark, and/or other devices, including handheld devices and others. Even if the device is a computer 404, it may be part of a client-server network or it may be a peer in a peer-to-peer network, or it may be a node in some other type of network.

Data structures 420 represent checkpoints 422 and corresponding fallout metrics 426. Familiar data structuring techniques can be used, such as records, structs, links, fields, pointers, constants, variables, arrays, lists, trees, bitflags, and so on. The visual representations 304 of checkpoints, and the visual representations 302, 306 of fallout metrics, can be distinguished from their respective data structures 422 and 426, in that the visual representations are seen by users 402 while the data structures typically are not. It will be understood, however, when implementing the invention that the data structures and their presentation to users are closely and functionally related in that the data structures 420 guide the presentation 116, 118, and the user provides 102 input for the modifying step(s) 104 based on the presentation. Thus, checkpoints may generally be referred to with any of the reference numbers 422, 424, 304, and fallout metrics may generally be referred to with reference numbers 426, 428, 302, 306. Data structure component 424 refers to state information for checkpoints, e.g., screen location 212, and whether the checkpoint has been modified 104 since the last fallout calculation 114. Data structure component 428 likewise refers to state information for fallout metrics, e.g., screen location of the presentation(s) 302 (optional), 306 (fallout and/or conversion), and whether it can be reused 120 based on recent checkpoint change(s) 104. Different implementations may use different state information, and different data structure implementations.

Some embodiments of the present invention provide a web analytics system, which includes a processor 406; a memory 414 which is interoperable with the processor; a display 202; a sequence of displayed checkpoints 304 configuring the display, each checkpoint representing at least one web page 436 in a web analytics database 432; and checkpoint sequence fallout metrics management code 418, 412 configuring the memory, the code capable of execution by the processor to modify the display by adding 106 a checkpoint to the sequence of displayed checkpoints in response to user action 102 and then automatically displaying 116, 118 without further user input a current corresponding sequence of fallout metrics 306 which reflect fallout between displayed checkpoints. In some embodiments, the sequence of displayed checkpoints 304 and the current corresponding sequence of fallout metrics 306 are displayed 116, 118 without entirely regenerating 114 the fallout metrics from raw analytics data. In some, the checkpoint sequence fallout metrics management code 418 reuses 120 a previously calculated fallout metric 426 rather than recalculating that fallout metric. In some, the display is configured by a visual indication 122 that fallout from one checkpoint to another checkpoint is total, e.g., color difference, unusual icon, flashing graphic, filled bar, slider at one end of its range, or the like. In some, a displayed fallout metric 306 includes both a fallout value and a conversion (non-fallout) value for a pair of displayed checkpoints; in others, it includes only one of those values.

Some embodiments include a computer-readable storage medium 416 such as a flash memory, CD, DVD, removable drive, or the like, which is configured to work in conjunction with a processor 406 to perform a process for checkpoint sequence fallout metric management as discussed herein, e.g., as illustrated in FIG. 1. A hard disk, RAM, tape, or other memory 414 in a device 404 may also be configured to serve as a computer-readable storage medium 416 embodying the invention. It will be understood that method embodiments and configured media embodiments are generally closely related, in the sense that many methods can be implemented using code that configures a medium, and that many configured media are configured by code 418 which performs a method. Those of skill will understand that legally equivalent methods may also be performed using hardwired special-purpose hardware which does not contain a ROM, PROM, EEPROM, RAM, or other memory medium embodying code 418 that performs a method like that shown in FIG. 1, but such implementations are expected to be unusual because of the generally high cost of implementing methods completely in silicon without a medium containing microcode or other code.

For example, some embodiments include a computer readable storage medium 416, configured with instructions 418 for performing a method of displaying information in a user interface during path analysis, the method including interactively configuring a display by: modifying 104 a sequence of displayed checkpoints in response to user action, each checkpoint representing at least one web page, and then without further user action automatically displaying with the modified sequence of displayed checkpoints 304 a current corresponding sequence of fallout metrics 306 which reflect fallout between displayed checkpoints, without entirely regenerating 120 the fallout metrics from raw analytics data. Other steps and limitations of the methods already discussed can also be present in methods performed by configured media 416. For example, in some configured media 416 the modified sequence of displayed checkpoints and the current corresponding sequence of fallout metrics are displayed simultaneously to a user 402 in a single window of a display.

ADDITIONAL EXAMPLES

The present invention was conceived in connection with the design of analytics provider software, specifically the Discover brand product of Omniture, Inc., but it will be understood that the invention may also be embodied in software directed at other fields of use. Some of the intended operational capabilities of the Discover brand product may be helpful in further illustrating the invention and its use, and for that reason are noted below. This discussion does not limit the invention to the particular features described, or to the presentation and management of web analytics data. Prescriptive statements apply to the contemplated product, not necessarily to the embodied invention.

A fallout report opens with a watermark 210 of a funnel (50% opacity), a blue background, and silver bars 212 where pages should be dragged and dropped 102. There should be two dashed boxes 212 with text "Drag and Drop Page Here". A page selector is open by default. The report runs when two pages are selected and added 102, 106; if only one page is added to a new report, no fallout is present so no fallout metrics 306 are reported 118. Dragging one page over another prompts the user "combine?", and users can replace 108 a checkpoint definition by adding a new page 436 to it. Thus, when pages are dragged onto each other, a highlight should appear over the existing page indicating that the new page is being added; upon release of the drag a dialog box should appear requesting that the user 402 create a page grouping 422. A name 424, 304 will be required to save the page grouping. Upon renaming, the user should save the page group. An icon of multiple stacked pages should indicate that the checkpoint is a grouping of pages 436. Dragging above or below a page should prompt the user with "add?". The report should be centered, maximized within its space, auto-expand to the best fit according to the number of checkpoints selected on a checkpoint selection dialog box, and have a default date set to the date filter applied to the loaded data set.

On report open, an active tab should read "Advanced Fallout Report". Function managers should still be viewable in the existing location, e.g., panel 204. A dynamic date filter should be present, e.g., in panel 206. A line in panel 206 denotes the time period for the report being viewed. Data should change upon either a drag of date handlebars or a zoom of the dynamic date filter.

In this proposed implementation, three objects are in a fallout report: checkpoint page, successful path, unsuccessful progression. Steps between checkpoints have two components, namely, those that moved on successfully and those who have fallen out of the process. The checkpoint page/page grouping should have an associated page name 424 or page grouping name 424, and an associated number 304 of visits and percentage 302 of total visits. A clear statement should be given of the percentage of the tracked segment 432 that moved from one checkpoint to the next. A grey box with a green arrow shows 118 the continuation 426 downward; behind and to the sides of this icon 306 is a slider that balances based on the continuation percentage and the fallout percentage. When fallout is total, this slider shows 122 at one extreme position. To each side of the slider will be a faint outwardly pointing area that shows 118 the numeric continuation and fallout percentages.

In some embodiments, on hovering over the continuation arrow, a mouse over box should appear. Statistics are given 118 in the box, including: minimum pageviews per path between the two checkpoints (find 114 lowest number of pageviews from the visitors 438 from the segment), which is the quickest way a visitor 438 progressed to the next checkpoint; average pageview per path between the two checkpoints (find 114 visitors from segment total pageviews between checkpoint and then divide 114 by visitor count); and maximum pageviews per path between the two checkpoints (find 114 highest number of pageviews from the visitors from the segment), which is the longest path on which a visitor 438 progressed to the next checkpoint.

An arrow should designate 118 that a certain percentage of those visits leaving the checkpoint fell out of the path. This arrow should lead to information 426 showing: top five site pages 436 that people left and did not come back into the path; number and percentage of visits, based upon 100% of those that did not continue in the path; all other pages visitors went to, summed for visits and percentage. Right clicking on "all others" or the all others visit metrics to show more will add five more entries each time it is selected. A red arrow icon pointing up and to the right designates 118 those who exited the site 436, with text label "Exited Site". All pages/items should show the number and percentage of visits, based upon 100% of those that did not continue in the path. Links should be given to other reports, e.g., anytime the top five exit pages out of a checkpoint are shown 118, the user 402 should be able to left click on the "all others" stat to launch a next page flow report for that particular checkpoint page 436. This will not be supported for checkpoints that are defined as a group of pages. The next page flow analysis report will open on a new analysis tab, with the checkpoint page as the starting point, the same segment, and the same date filter.

CONCLUSION

Although particular embodiments of the present invention are expressly illustrated and described herein as methods, for instance, it will be appreciated that discussion of one type of embodiment also generally extends to other embodiment types. For instance, the descriptions of methods also help describe devices, configured media, and method products. Limitations from one embodiment are not necessarily read into another.

All claims as filed are part of the specification and thus help describe the invention, and repeated claim language may be inserted outside the claims as needed without violating the prohibition against new matter. Terms such as "a" and "the" are inclusive of one or more of the indicated item or step. In the claims a reference to an item means at least one such item is present and a reference to a step means at least one instance of the step is performed, in the absence of a clear indication that the item or step is optional, in which case it may be present/performed. Headings herein are provided for convenience only; information on a given topic may often be found outside the section whose heading indicates that topic. Any apparent inconsistencies in the text associated with a given reference number should be interpreted to broaden to meaning of that reference number.

Embodiments such as the methods illustrated or corresponding systems may omit items/steps, repeat items/steps, group them differently, supplement them with familiar items/steps, or otherwise comprise variations on the given examples. Suitable software to assist in implementing the invention is readily provided by those of skill in the pertinent art(s) using the teachings presented here and programming languages and tools, including without limitation except as expressly required, JavaScript code, as well as other scripting languages, HTML, XML, APIs, SDKs, network protocol stacks, assembly language, firmware, microcode, compilers, debuggers, and/or other languages and tools.

Although this document includes at least one website address, such addresses and the material on the sites thus addressed are provided only for background and/or as examples to help illustrate the invention. This document does not incorporate by reference any essential material from such websites.

The embodiments discussed are illustrative of the application for the principles of the present invention. Numerous modifications and alternative embodiments can be devised without departing from the spirit and scope of the present invention.

We claim:

1. A method of interactively displaying information in a user interface during website path analysis, comprising interactively configuring a display by:
    displaying, via a graphical user interface, a fallout report, comprising:
        a sequence of checkpoints defining a path to be taken by website visitors; and
        a sequence of fallout metrics corresponding to the sequence of checkpoints displayed, wherein each the fallout metrics is associated with a pair of consecutive checkpoints of the sequence of checkpoints and is indicative of a number of website visitors that do not follow the path from a first checkpoint of the pair of consecutive checkpoints to a second checkpoint of the pair of consecutive checkpoints;
    receiving a user input requesting to modify the sequence of checkpoints;
    modifying, in response to user input, the sequence of checkpoints to generate a modified sequence of checkpoints defining a modified path to be taken by a website visitors, the modifying step including at least one of:
        adding a checkpoint to the sequence of checkpoints,
        replacing a checkpoint in the sequence of checkpoints,
        deleting a checkpoint from the sequence of checkpoints, or
        changing the position of a checkpoint relative to another checkpoint in the sequence of checkpoints; and
    automatically displaying via the graphical user interface, a modified fallout report comprising:
        the modified sequence of checkpoints; and
        a modified sequence of fallout metrics corresponding to the modified sequence of checkpoints displayed, wherein the modified sequence of fallout metrics is different than the sequence of fallout metrics,
    wherein automatically displaying the modified fallout report comprises, in response to the user input requesting to modify the sequence of checkpoints, automatically, without requiring additional user input, updating the graphical user interface to display the modified fallout report such that the graphical user interface provides an interactive display of a fallout report that is dynamically updated as a user request to modify the currently displayed sequence of checkpoints is received.

2. The method of claim 1, wherein the modified sequence of checkpoints and the modified sequence of fallout metrics are displayed simultaneously in a single window.

3. The method of claim 1, wherein displaying a modified sequence of fallout metrics comprises at least one of the following:
    a current fallout metric corresponding to two consecutive displayed checkpoints is displayed between those checkpoints;
    a current fallout metric corresponding to two consecutive displayed checkpoints is displayed on one of those checkpoints;
    a current fallout metric corresponding to two consecutive displayed checkpoints is displayed within one fifth of the display's visible viewing width of at least those checkpoints; or
    a current fallout metric corresponding to two consecutive displayed checkpoints is displayed within one fifth of the display's visible viewing height of at least those checkpoints.

4. The method of claim 1, wherein before the modifying step the sequence of checkpoints included at least two checkpoints and the display also showed a then-current fallout metric reflecting fallout from one checkpoint of the sequence of checkpoints to another checkpoint of the sequence of checkpoints.

5. The method of claim 1, wherein no user command is accepted by the user interface between completion of modifying the sequence of checkpoints and completion of automatically displaying the modified fallout report.

6. The method of claim 1, wherein no user keyboard input is received through the user interface between beginning the step of modifying the sequence of checkpoints and completion of automatically displaying the modified fallout report.

7. The method of claim 1, wherein automatically displaying the fallout report includes indicating in the display that fallout from one checkpoint to another checkpoint is total.

8. The method of claim 1, wherein receiving a user input requesting to modify the sequence of checkpoints comprises at least one of the following:
    receiving a user input requesting to add a checkpoint to the sequence of displayed checkpoints, wherein the user input comprises a drag-and-drop operation to insert the added checkpoint; or
    receiving a user input requesting to replace a checkpoint in the sequence of displayed checkpoints, wherein the user input comprises a drag-and-drop operation to replace one checkpoint with another checkpoint.

9. The method of claim 1, further comprising at least one of the following:
    defining a checkpoint by specifying a web page, in a web analytics system for tracking web page visits; or
    defining a checkpoint by specifying a plurality of web pages in a web analytics system for tracking web page visits, such that a visit to any of the specified web pages serves as a visit to that checkpoint for the purpose of determining fallout.

10. The method of claim 1, wherein the modified sequence of fallout metric comprises, for at least a pair of displayed checkpoints:
    a fallout value indicative of a number of website visitors that do not follow the path from a first checkpoint of the pair of consecutive checkpoints to a second checkpoint of the pair of consecutive checkpoints; and
    a conversion indicative of a number of website visitors that do follow the path from a first checkpoint of the pair of consecutive checkpoints to a second checkpoint of the pair of consecutive checkpoints.

11. The method of claim 1, further comprising generating the sequence of modified fallout metrics, wherein generating the sequence of fallout metrics comprises using at least one previously calculated fallout metric such that the modified fallout metrics are not entirely generated from raw analytics data.

12. A computer readable storage medium, configured with instructions for performing a method of displaying information in a user interface during path analysis, the method comprising:
    displaying, a fallout report, comprising:
        a sequence of checkpoints defining a path to be taken by website visitors; and
        a sequence of fallout metrics corresponding to the sequence of checkpoints displayed, wherein each the fallout metrics is associated with a pair of consecutive checkpoints of the sequence of checkpoints and is indicative of a number of website visitors that do not follow the path from a first checkpoint of the pair of consecutive checkpoints to a second checkpoint of the pair of consecutive checkpoints;
    receiving a user input requesting to modify the sequence of checkpoints;
    modifying, in response to user input, the sequence of checkpoints to generate a modified sequence of checkpoints defining a modified path to be taken by a website visitors, the modifying step including at least one of:
        adding a checkpoint to the sequence of checkpoints,
        replacing a checkpoint in the sequence of checkpoints,
        deleting a checkpoint from the sequence of checkpoints, or
        changing the position of a checkpoint relative to another checkpoint in the sequence of checkpoints; and
    automatically displaying, a modified fallout report comprising:
        the modified sequence of checkpoints; and
        a modified sequence of fallout metrics corresponding to the modified sequence of checkpoints displayed, wherein the modified sequence of fallout metrics is different than the sequence of fallout metrics,
    wherein automatically displaying the modified fallout report comprises, in response to the user input requesting to modify the sequence of checkpoints, automatically, without requiring additional user input, updating the graphical user interface to display the modified fallout report such that the graphical user interface provides an interactive display of a fallout report that is dynamically updated as a user request to modify the currently displayed sequence of checkpoints is received.

13. The medium of claim 12, wherein the modified sequence of checkpoints and the modified sequence of fallout metrics are displayed simultaneously to a user in a single window of a display.

14. The medium of claim 12, wherein displaying a modified sequence of fallout metrics comprises at least one of the following:
    a current fallout metric corresponding to two consecutive displayed checkpoints is displayed between those checkpoints;
    a current fallout metric corresponding to two consecutive displayed checkpoints is displayed on one of those checkpoints;
    a current fallout metric corresponding to two consecutive displayed checkpoints is displayed within one fifteenth of the display's visible viewing width of at least those checkpoints; or
    a current fallout metric corresponding to two consecutive displayed checkpoints is displayed within one fifteenth of the display's visible viewing height of at least those checkpoints.

15. The medium of claim 12, wherein automatically displaying the fallout report includes indicating at least visually in the display that fallout from one checkpoint to another checkpoint is total.

16. The medium of claim 12, wherein no user keyboard input is received through the user interface between beginning the step of modifying the sequence of checkpoints and completion of automatically displaying the modified fallout report, and wherein receiving a user input requesting to modify the sequence of checkpoints comprises at least one of the following:
    receiving a user input requesting to add a checkpoint to the sequence of displayed checkpoints, wherein the user input comprises a drag-and-drop operation to insert the added checkpoint; or
    receiving a user input requesting to replace a checkpoint in the sequence of displayed checkpoints, wherein the user input comprises a drag-and-drop operation to replace one checkpoint with another checkpoint.

17. The medium of claim 12, wherein the program instruction are further configured to cause generating the sequence of modified fallout metrics, wherein generating the sequence of fallout metrics comprises using at least one previously calculated fallout metric such that the modified fallout metrics are not entirely generated from raw analytics data.

18. A web analytics system, comprising:
- a memory having program instructions stored thereon; and
- a processor configured to execute the program instructions, wherein execution of the program instruction is configured to cause:
    - displaying, via a graphical user interface, a fallout report, comprising:
        - a sequence of checkpoints defining a path to be taken by website visitors; and
        - a sequence of fallout metrics corresponding to the sequence of checkpoints displayed, wherein each the fallout metrics is associated with a pair of consecutive checkpoints of the sequence of checkpoints and is indicative of a number of website visitors that do not follow the path from a first checkpoint of the pair of consecutive checkpoints to a second checkpoint of the pair of consecutive checkpoints;
    - receiving a user input indicative of a request to modify the sequence of checkpoints; and
    - modifying, in response to the user input, the sequence of checkpoints to generate a modified sequence of checkpoints defining a modified path to be taken by a website visitors, the modifying step including at least one of:
        - adding a checkpoint to the sequence of checkpoints,
        - replacing a checkpoint in the sequence of checkpoints,
        - deleting a checkpoint from the sequence of checkpoints, or
        - changing the position of a checkpoint relative to another checkpoint in the sequence of checkpoints, and
    - automatically displaying a modified fallout report, comprising:
        - the modified sequence of checkpoints; and
        - a modified sequence of fallout metrics corresponding to the modified sequence of checkpoints displayed, wherein the modified sequence of fallout metrics is different than the sequence of fallout metric,
    - wherein automatically displaying the modified fallout report comprises, in response to the user input requesting to modify the sequence of checkpoints, automatically, without requiring additional user input, updating the graphical user interface to display the modified fallout report such that the graphical user interface provides an interactive display of a fallout report that is dynamically updated as a user request to modify the currently displayed sequence of checkpoints is received.

19. The system of claim 18, wherein the modified sequence of fallout metric comprises, for at least a pair of displayed checkpoints:
- a fallout value indicative of a number of website visitors that do not follow the path from a first checkpoint of the pair of consecutive checkpoints to a second checkpoint of the pair of consecutive checkpoints; and
- a conversion indicative of a number of website visitors that do follow the path from a first checkpoint of the pair of consecutive checkpoints to a second checkpoint of the pair of consecutive checkpoints.

20. The system of claim 18, further comprising generating the sequence of modified fallout metrics, wherein generating the sequence of fallout metrics comprises using at least one previously calculated fallout metric such that the modified fallout metrics are not entirely generated from raw analytics data.

* * * * *